UNITED STATES PATENT OFFICE.

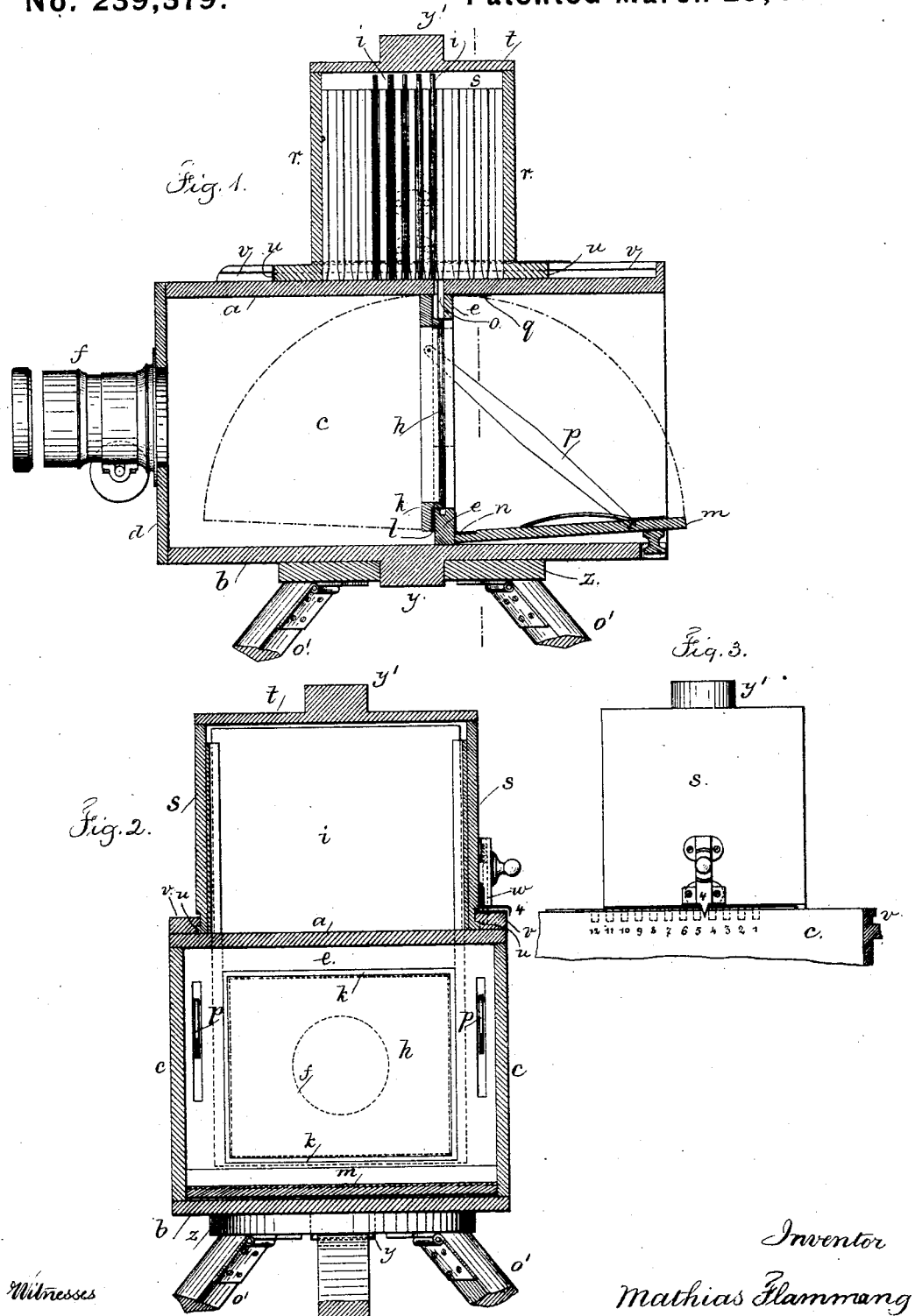

MATHIAS FLAMMANG, OF NEWARK, NEW JERSEY, ASSIGNOR TO SCOVILL MANUFACTURING COMPANY, OF WATERBURY, CONNECTICUT.

CAMERA.

SPECIFICATION forming part of Letters Patent No. 239,379, dated March 29, 1881.

Application filed January 17, 1881. (No model.)

*To all whom it may concern:*

Be it known that I, MATHIAS FLAMMANG, of Newark, in the county of Essex and State of New Jersey, have invented an Improvement in Photographic Apparatus, of which the following is a specification.

This invention relates to a camera and plate-holder for sensitized dry plates, and is adapted to the taking of landscapes and other views, where the camera and plate-holder have to be moved from place to place.

Cameras have been made in which the plates are in a box, and one at a time is received from the box into a slide and moved up to the proper position. It is, however, difficult to manipulate the parts, and the light is liable to pass into the camera.

I make use of a camera-box in which there is a swinging focusing-glass and a swinging shutter, connected together in such a manner that the glass is brought up to position by the opening of the shutter, and turned down out of the way of the plate by the closing of the shutter. I also employ a plate-holding box set to slide in ways upon the camera, and a bolt and an index, so that the box can be moved to the proper points for allowing one plate after another to pass into the camera. The camera is turned upside down, for allowing the plate to pass, by gravity, out of the camera into the box, and the reverse, the plate being allowed to slide, by gravity, into the camera when in its normal position, and when the plate-holding box is moved so that the plate to be used is brought to the opening in the camera-box, into which it slides.

In the drawings, Figure 1 is a vertical section of the camera and plate-holding box. Fig. 2 is a cross-section of the same, and Fig. 3 is an external view of the bolt and index for the plate-holding box.

The camera-box is made of the top $a$, bottom $b$, sides $c$ $c$, and end $d$, and the lens-holder $f$ is of the ordinary character. Within the camera-box there is a stationary frame, $e$, having grooves in the vertical portions thereof for the reception of one of the dry plates or glasses, $i$, and there is a mortise or opening in top of the camera-box, at $o$, for the plate to pass into such grooves, such mortise being slightly wider than the grooves in the frame $e$, so that the plate will not touch against the camera-box as it is slid in or out of the camera.

The focusing-glass $h$ is in a frame, $k$, hinged at $l$ to the frame $e$, and this frame $k$ is smaller than the frame $e$, and the portion that holds the glass passes into the frame $e$, and the ground surface of the focusing-glass, when turned up to its place, occupies the same plane that the sensitized surface of the glass afterward occupies when it is introduced into the camera, so that the image will be distinct.

The shutter $m$ is hinged at $n$ to the back of the frame $e$, and it is connected by the links $p$ to the frame $k$, that pass through slots in the frame $e$ outside the vertical grooves that receive the glass. By this means the glass can be swung up to its place to receive the image, in adjusting the focus, the shutter at the back being turned down; or when the picture is to be taken the shutter is closed up from behind and the glass simultaneously swung down out of the way, the shutter remaining closed by frictional contact with the small pad at $q$ upon the inner surface of the camera-box.

The box for the sensitized dry plates $i$ is composed of the ends $r$, sides $s$, and top $t$. There are grooves in the inner surfaces of the sides $s$ of the box for the sensitized plates, and there are flanges $u$, that slide between the ways $v$ $v$ upon the top of the camera-box. The bolt $w$ can be passed into either one of the holes in the ways $v$, and there is a pointer, 4, projecting from the plate-holding box, and figures upon the camera in such positions as to indicate which of the glasses in the box is in line with the grooves in the frame $e$.

It is now to be understood that the plate-holding box is to be slipped out from the ways upon the camera for the removal of one set of plates and the insertion of another set. This is to be done in an ordinary dark room, and then the plate-holding box is slipped into place upon the camera, the end portion of the box covering the opening, and the edges of the plates resting upon the top of the box. After the camera has been adjusted to the proper focus the ground glass is to be turned down out of the way, the shutter closed, and then the plate-holding box is moved along until the proper plate is in position, and drops, by gravity, into the grooves in e. The bolt w is shot so as to hold the plate-holder in proper position upon the camera. After the picture has been taken the reverse movement returns the negative or dry sensitized plate into the plate-holding box, when the camera is turned upside down.

I remark that this camera may be supported upon any suitable legs or tripod. The bottom b may have a cylinder or plug, y, upon it to enter the central hole in the plate z that is upon the tripod-legs o', and there may be a similar cylinder or plug, y', upon the box, whereby it is supported when the camera and box are turned over for the plate to slide back into the plate-holding box.

I claim as my invention—

1. In a photographic camera, a focusing-glass in a frame hinged at one edge and swinging toward the lens, and a shutter hinged at one edge and connected to the frame of the focusing-glass, substantially as specified, whereby the glass is moved into and out of position by the movement of the shutter, substantially as set forth.

2. The combination, with a camera-box and lens, of a stationary frame, a focusing-glass and its frame hinged at its edge, a shutter hinged at one edge, links p, passing through slots in the stationary frame and connecting the shutter with the frame of the focusing-glass, substantially as set forth.

3. The combination of the camera-box, having the stationary frame e, with the focusing-glass and its frame, hinged at one edge, the swinging shutter, hinged at one edge and connected to the focusing-glass, the plate-holding box, adapted to slide longitudinally upon the camera, and a bolt or similar device for holding the plate-holding box in position, substantially as set forth.

Signed by me this 7th day of January, A. D. 1881.

M. FLAMMANG.

Witnesses:
HAROLD SERRELL,
GEO. T. PINCKNEY.